United States Patent Office 3,323,752
Patented June 6, 1967

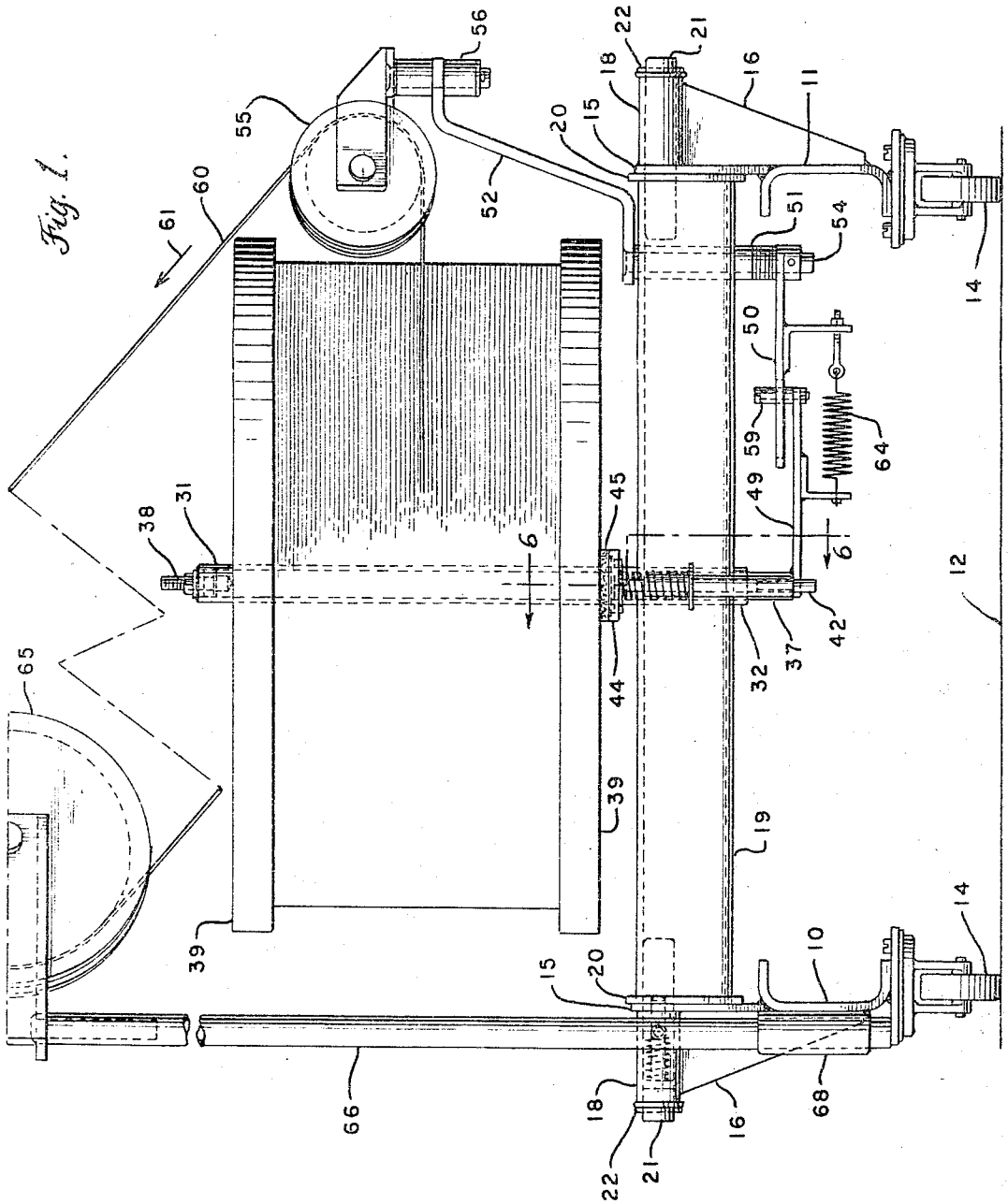

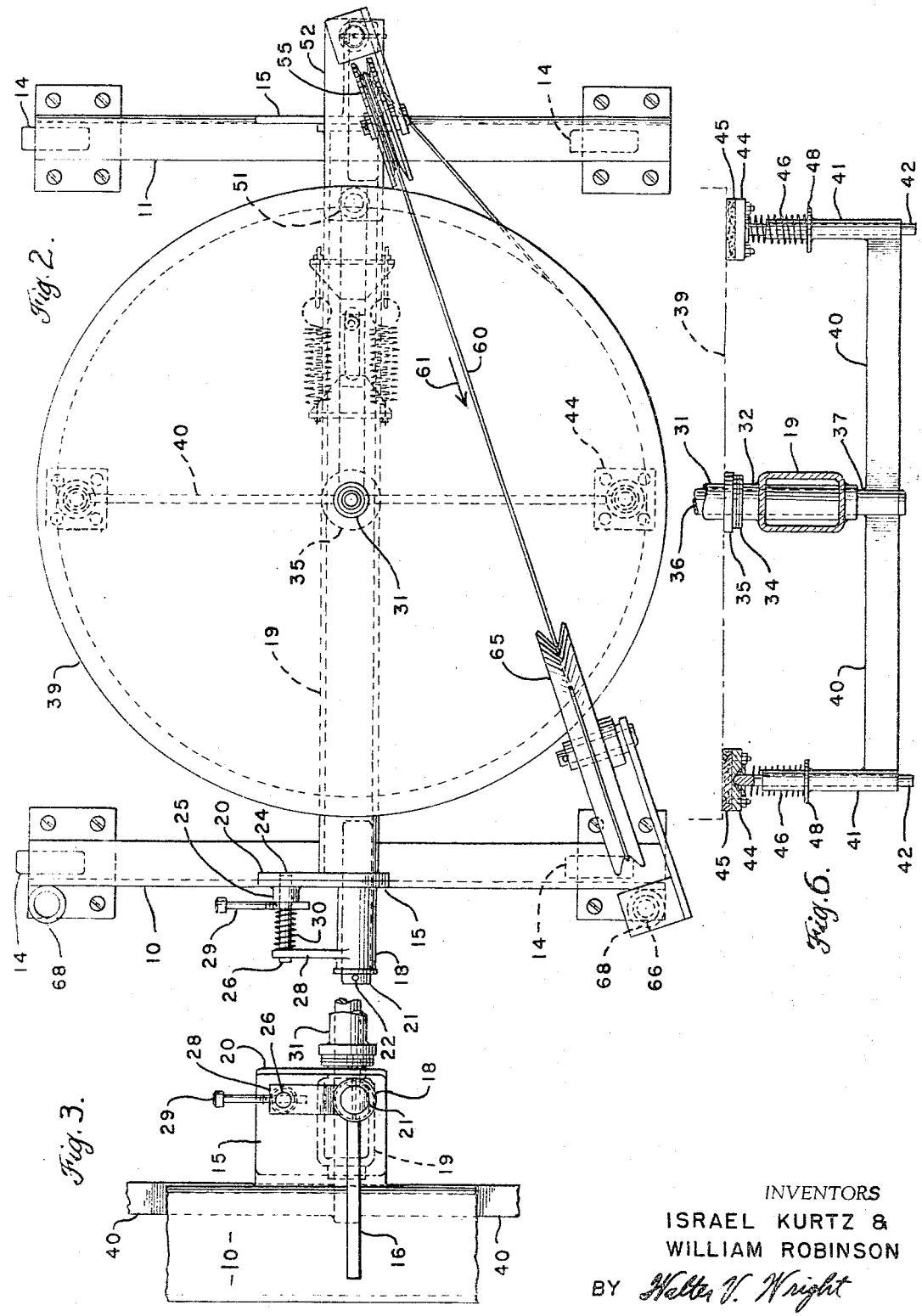

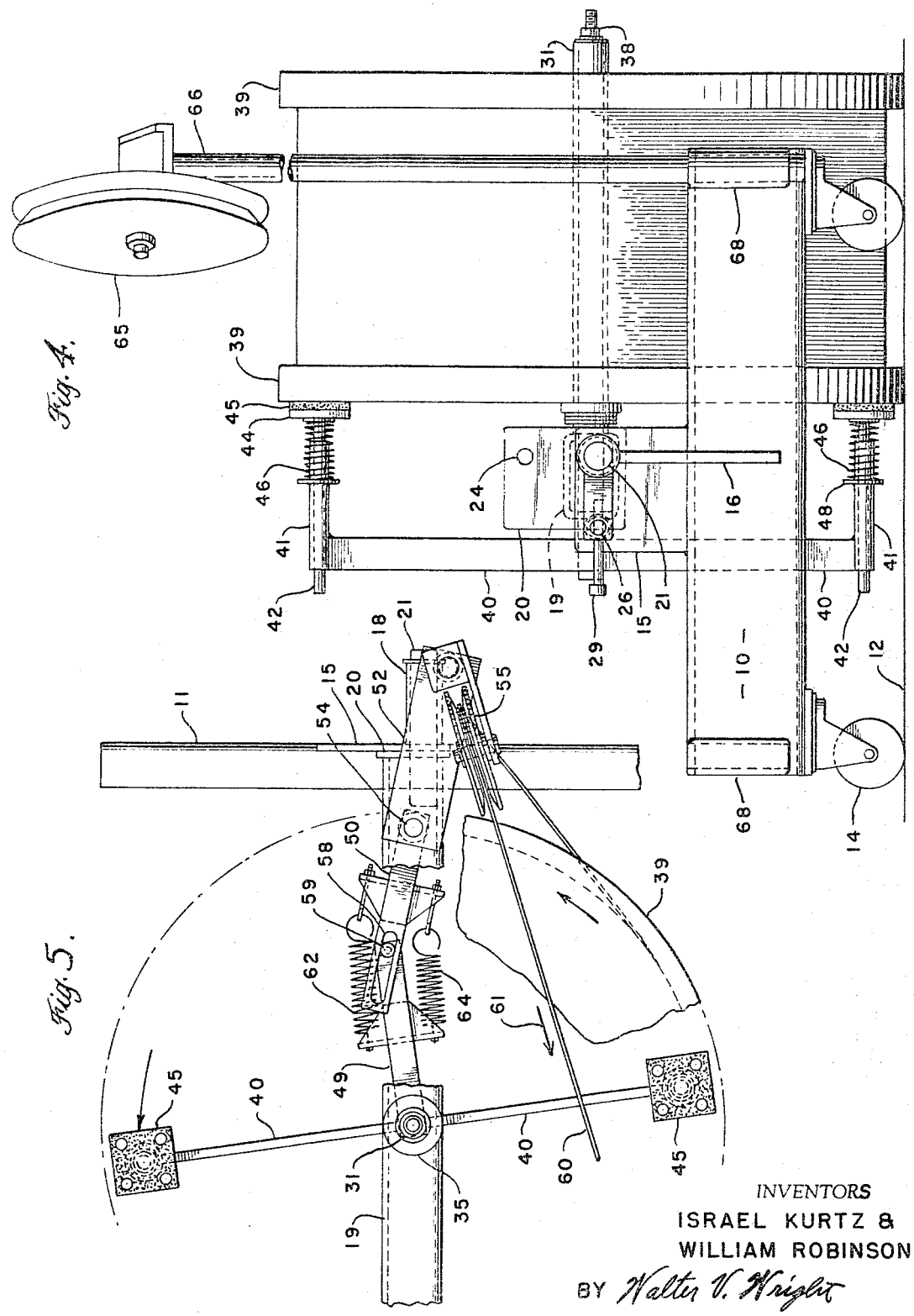

3,323,752
WELDING WIRE SPOOL STAND
Israel Kurtz, East Earl, and William Robinson, Honey Brook, Pa., assignors to Sperry Rand Corporation, New Holland, Pa., a corporation of Delaware
Filed Apr. 27, 1966, Ser. No. 545,646
7 Claims. (Cl. 242—129.8)

This invention relates to apparatus for supporting a supply spool of welding wire or the like from which wire is intermittently drawn by an electric welding machine or other wire consuming device.

In recent years in electric arc welding machines for use in production lines and other continuous use operations, the conventional welding rod electrode has been largely replaced by an electrode in the form of a long continuous metallic strand, commonly known as welding wire. The relatively long welding wire electrode is fed into a welding gun from a supply spool or the like as a welding operation is performed. Power driven feed rolls in the welding machine advance the wire electrode to the gun and draw it from the spool at the same rate at which the electrode is consumed during the welding operation.

Welding wire may be purchased in spools of various sizes. A sixty pound spool, for example, may contain around four miles of wire; a two hundred fifty pound spool may contain in excess of sixteen miles of wire. Considerable savings can be realized by purchasing the larger spools of wire, not only in initial purchase cost, but also in the reduction of welding machine down time for reloading.

The larger welding wire spools, however, are considerably more difficult to handle than the light spools and their mass and inertia result in heavy loading and excessive wear on the welding machines' wire feeding rolls. In some cases, the spools are unwound by spool driving motors driven in synchronism with the wire feed rollers of the welding machine. The cost of such apparatus and the difficulty of handling the large spools opposes the considerable advantages afforded by the large spools.

It has been found that it requires little additional pull on the wire to rotate the larger size spools once the initial inertia of the spool has been overcome and the spool starts rotating. In an average welding operation, the spool unwinds very slowly, as the welding wire is consumed at a linear rate only slightly in excess of one foot every two seconds. Naturally, the wire feeding operation stops at the completion of each weld bead. In this type of operation, the tendency of the spool to overrun at the completion of a wire feeding operation is much less of a problem than in the case of high speed wire feeding operations. Of greater importance are the problems of handling the large spools and overcoming their considerable starting inertia at the beginning of each wire feeding operation.

In most industrial operations, it is not too difficult to deliver even a large spool of welding wire to the general vicinity of a welding machine. This is accomplished by industrial fork lift trucks or the like. A major difficulty lies in getting the heavy spool journalled on a support stand and located in the proper particular position relative to the welding machine which it is to supply.

It is an object of this invention to provide a feeding stand for large supply spools of welding wire or the like which will greatly simplify the problems normally associated with the handling and use of such spools.

It is another object of this invention to provide a feeding stand for large supply spools of welding wire or the like which will play out wire solely in response to a demand pull on the wire by a welding machine or the like without overloading the wire feeding mechanism of the machine.

It is another object of this invention to provide a feeding stand for large supply spools of welding wire or the like including low cost nonpower driven mechanism for overcoming the starting inertia of the spool.

It is another object of this invention to provide a feeding stand for large supply spools of welding wire or the like including mechanism for overcoming the starting inertia of the spool by amplifying the force of a demand pull or the wire and employing the force to initiate unwinding movement of the spool by driving a spool end disc.

It is another object of this invention to provide a feeding stand for large supply spools of welding wire or the like of simple, low cost, rugged construction embodying a simple friction mechanism and linkage for overcoming both the starting and stopping inertia of a spool.

It is another object of this invention to provide a feeding stand for large supply spools of welding wire or the like which greatly facilitates the operation of loading a new spool on the stand.

It is another object of this invention to provide a feeding stand for large supply spools of welding wire or the like which can readily be moved from a welding machine or the like to a new spool for loading purposes and return when loaded to its operating location.

These and other objects and advantages of this invention will be apparent upon reference to the following description and claims taken in conjunction with the accompanying drawings wherein:

FIG. 1 is a fragmentary elevational view of a stand constructed in accordance with the principles of the present invention;

FIG. 2 is a plan view of the mechanism seen in FIG. 1;

FIG. 3 is a fragmentary detail view looking toward the right of FIG. 2 and showing the releasible latch device for locking the spool mounting spindle in operating position;

FIG. 4 is a side elevational view showing the elements of the spool stand in spool loading position;

FIG. 5 is a fragmentary plan view similar to FIG. 2 but showing the spool driving linkage in an operative position; and FIG. 6 is a cross-sectional view taken on the line 6—6 of FIG. 1.

Referring now to the drawings in detail, particularly FIGS. 1 and 2, parallel horizontal base members 10 and 11 of channel shaped cross-section are supported on the floor 12 by caster wheels 14. The caster wheels are preferably provided at each end of the respective members 10 and 11 and may be attached thereto in any suitable manner. Each of the base members 10 and 11 supports an upstanding plate 15 intermediate its ends. The plates 15 are made rigid with their respective base members 10 and 11 by gussets 16 (FIG. 1). Integrally attached to plates 15 and gussets 16 are hollow sleeve members 18 whose central axes extend perpendicular to the respective base members 10 and 11. A single central cross frame member 19 of box cross-section (FIG. 6) extends between the plates 15 of the respective members 10 and 11. End plates 20 are provided on the opposite ends of frame beam 19. Stub shafts 21 are rigidly carried by main beam 19 and project axially from opposite ends thereof through the end plates 20. The stub shafts 21 pass through apertures in the plates 15 and extend through the respective sleeve bearings 18. Cotter pins 22, or the like, pass through apertures in stub shafts 21 lying just beyond the outboard ends of the bearing sleeves 18. This construction provides a basically H-shaped frame wherein the cross frame member 19 is pivotable about the common axis of the stub shafts 21 within bearing sleeves 18.

Referring primarily to FIGS. 2 and 3, a simple latch structure is provided to normally lock the main frame beam 19 in the position shown in FIGS. 1 and 2. The particular end plate 20 which overlies and coacts with base member 10 has a latch pin hole 24 formed therethrough. The particular plate 15 carried by base member 10 has a cylindrical boss 25 fixedly attached to the side thereof opposite plate 20. A latch pin 26 is slidably received in boss 25 and has its other end slidably carried by the detent 28 projecting laterally from the sleeve member 18. A transversely extending operating handle 29 is carried by latch pin 26. A compression spring 30 encircles latch pin 26 between handle 29 and detent 28, thereby biasing latch pin 26 to the right as seen in FIG. 2 whereby it projects through boss 25 and latch pin hole 24 of plate 20 to lock main beam 19 in the position shown. As seen in FIG. 2, movement of handle 29 to the left effects withdrawal of latch pin 26 from latch pin aperture 24 in plate 20 thereby freeing main cross beam 19 to pivot about the common axis of stub shafts 21. When the pin 26 has been withdrawn from latch pin hole 24 and the main cross beam 19 pivoted from the position shown in FIGS. 1 and 2 to the loading position shown in FIG. 4, the end of pin 26 bears against plate 20 and slides thereon until such time as beam 19 is returned to the position shown in FIGS. 1 and 2 whereupon pin 26 under the action of spring 30, re-enters aperture 24 to lock beam 19 again.

A spindle 31 is carried by base frame member 19 midway between the channel frame members 10 and 11. Referring to FIG. 6, it may be seen that a sleeve 32 passes vertically through frame member 19 and is fixed thereto as by welding. A bearing 34 and spool supporting disc 35 rest on top of sleeve 32. The spindle 31 rests on top of disc 35 and is adapted to extend upwardly through the core of a wire spool as may be seen in FIG. 1. This assembly is held together by a central rod 36 which passes centrally through the entire assembly and projects from the bottom of sleeve 32 as shown at 37 in FIG. 6 the rod 36 is suspended from the upper end of spindle 31 by a threaded connector 38 as may be seen in FIG. 1.

The larger size spools of welding wire such as those containing two hundred fifty or five hundred pounds of wire, all have end discs 39 of substantially the same diameter. The full capacity of the spools is governed by varying the axial length of the spool center core member extending between the two end discs. The basic stand frame structure is constructed so that the common axis of stub shafts 21 is disposed above the floor a distance equal to the radius of the wire spool discs that are to be mounted on the stand.

When a welding machine operator runs out of electrode wire, a new spool may be delivered by rolling or by lift truck to the aisle most convenient for the operator of the welding machine. The welding wire spool stand may then be moved to the spool and the beam 19 released and pivoted to the position shown in FIG. 4. By rolling the spool stand up to the spool, on its castor wheels 14, the spindle 31 may be advanced into the axial hole through the spool core. From the FIG. 4 position, the spindle, spool, and beam 19 may be pivoted on stub shafts 21 to the operative position shown in FIGS. 1 and 2 with only a fraction of the effort required to lift the spool and lower it down over a vertical spindle. The spool stand may then be pushed on its castor wheels 14 back to its operative location relative to the welding machine. As previously mentioned, when beam 19 is pivoted from the horizontal orientation of FIG. 4 to the vertical orientation of FIGS. 1 and 2, the latch pin 26 automatically engages in the latch pin hole 24 of plate 20 to lock the beam and spindle in operative position.

In FIG. 6 it may be seen that an arm 40 is welded, or otherwise fixedly attached, to the bottom projection 37 of rod 36 which extends downwardly through the center of spindle 31. Preferably, there are two arms 40 projecting from diametrically opposite sides of the rod 36. At the radially outer end of the arm, or arms, 40 a vertical sleeve member 41 is attached. A spindle 42 extends vertically through the sleeve 41. A plate 44 having a pad of friction material 45 mounted on its upper surface, is swivally attached to the upper end of spindle 42. A coil spring 46 is interposed between the plate 44 and stop washer 48 welded on the sleeve 41. The spring 46 urges the friction plate 44 upwardly into engagement with the underside of the spool disc 39 on spindle 31. The arm 40 is preferably of a length to disposed plate 44 at the outer perimeter of the spool disc.

In FIGS. 1 and 5 it may be seen that a first lever 49 is rigidly attached to the arm 40 and extends radially from the rod 36 toward frame member 11. A lever assembly comprising a first arm 50, a combined fulcrum-pivot element 51, and a second arm 52 (see FIG. 1) is mounted on a pivot pin 54 carried by frame member 19. A wire guide pulley 55 is pivotally mounted at 56 on one end of the lever assembly. Referring to FIG. 5, an elongated slot 58 is formed in first arm 50 at the radially intermost end thereof. A pin 59 (FIG. 1) is fixedly attached to the outer end of lever 49 and extends upwardly through the slot 58 of lever arm 50. As best seen in FIG. 5, a demand pull on wire 60 in the direction of arrow 61 (see also FIG. 1) causes the lever assembly 50, 51, and 52 to swing clockwise about pivot pin 54. The edges of slot 58 drive lever 49 counterclockwise about the spindle mounting axis through engagement with pin 59 on lever 49. This driving force rotates the integral arm, or arms, 40 counterclockwise about the axis of spindle 31 also. The pads 44 with their friction surfacing 45 bearing on the underside of spool discs 39 initiate the rotational movement of the wire spool in a direction to play out wire from the spool. Since the lever assembly 50, 51, and 52 is a lever of the first class, it amplifies the force of the demand wire pull initiating its operation. This force is applied to drive spool disc 39 through the lever 49, arms 40 and pads 45 via the slot and pin 58 and 59. The actual disc driving force is applied to the spool disc at the outer perimeter of the disc where it is most effective. The actual contact force between friction plates 44 and the underside of spool disc 39 is relatively light as evidenced by the light weight springs 46. The idea is not to spin the wire spool, but merely to start it turning by overcoming its inertia. The spool rotates on the bearing 34 quite easily after the starting inertia has been overcome. By applying the starting force to the advantageous location adjacent its outer perimeter, only limied amplification of the regular wire feeding force is required. Referring to FIG. 5, it will be apparent that the pads 45 are limited in the extent of their pivotal movement by the length of slot 58 in lever arm 50. When this extent of movement has been reached, the pads 45 merely slide relative to the spool disc 39. The limited drag created by these pads is well within the driving capability of the welding wire feed mechanism of the welding machine after the starting inertia of the spool has been overcome.

In FIGS. 1 and 5 it may be seen that a pair of springs 62 and 64 are connected across the jointure between levers 50 and 49 in a manner to urge these two members into alignment. These springs are adjusted to zero tension when the members 49 and 50 are aligned. As shown in FIG. 5, operation of the lever system effects a tensioning of the spring 62 which serves to return the levers to their original positions when the demand pull on the wire 60 stops. This return movement is accompanied by return of the friction pads 45 to their initial position. As the pads move back to their original position, they exert a braking action on the spool disc 39 to reduce the extent of overrun of the spool. At the same time, the guide pulley 55 returns from its FIG. 5 position to its FIG. 2 position thereby taking up the slack wire that is unwound as the spool comes to a halt.

Referring to FIG. 2, the path of travel of the wire is from the wire spool to the underside of guide pulley 55, around pulley 55 and over the spool to a large upper guide pulley 65 which is journalled atop a stanchion 66. The wire passes under and around pulley 66 and travels from the upper side of pulley 66 to the welding machine, which is normally located to the right of the spool stand as it is shown in FIG. 2. In this manner the wire is looped about guide pulley 55 as seen in FIGS. 1 and 2 thereby facilitating the previously mentioned slack take-up operation. The stanchion 66 upon which guide pulley 65 is carried, is mounted in a socket 68 welded to frame member 10. In FIG. 2 it may be seen that the socket structure 68 is duplicated at each end of frame member 10. With this arrangement the pulley 65 may be mounted on the other end of frame member 10 from that shown if it is desired to mount the spool on the stand inverted from the position shown, whereby the wire would unwind from the spool in the opposite direction from that shown in FIG. 2. The use of two springs 62 and 64 enables the lever system which initiates spool rotation to operate in either direction. This interchangeable feature is also employed if one of the spooled discs has been damaged during handling and it is preferable to locate the other spool disc on the under side when mounting.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A stand for feeding welding wire or the like from a supply spool in response to a demand pull on the wire wherein said spool has a central core and an end disc, said stand comprising a frame, journal means on said frame defining a vertical axis about which said spool rotates to unwind wire, an arm journalled on said frame for oscillation about said axis on the underside of a spool disc on said journal means, a friction member disposed adjacent the outer perimeter of a spool disc on said journal means, means mounting said friction member on said arm and yieldably urging said friction member against said spool disc, a wire guide element about which said wire passes in travelling from said spool, a first lever rigidly integral with said arm and projecting radially outwardly from said axis toward said wire guide element, a second lever assembly having a portion intermediate its ends journalled on said frame, means mounting said wire guide element on one end of said lever assembly for movement relative to said frame in response to a demand pull on the wire, means interconnecting the other end of said lever assembly and said radially outwardly projecting end of said lever to pivot said friction member relative to said frame in response to movement of said wire guide element and start said spool disc turning on said journal means in a direction to unwind wire from said spool, and means returning said guide element and said friction member to their original positions upon cessation of said demand pull whereby said friction member exerts a breaking action on said spool disc.

2. A stand for feeding welding wire or the like from a supply spool as recited in claim 1 wherein said means interconnecting the other end of said lever assembly to said radially outwardly projecting end of said lever comprises, means on one of said levers defining an elongated slot, a pin fixedly carried by the other of said levers and received in said slot whereby oscillation of said lever assembly about its journal in response to a demand pull on the wire passing about said guide element effects oscillation of said lever and said arm about said spool journalling axis within the limits afforded by the length of said elongated slot.

3. A stand for feeding welding wire or the like from a supply spool as recited in claim 1 wherein said portion of said lever assembly journalled on said frame is disposed closer to said other end of said lever assembly than to said one end of said lever assembly.

4. A stand for feeding welding wire or the like from a supply spool in response to a demand pull on the wire wherein said spool has a central core and an end disc, said stand comprising a frame, means journalling said spool core on said frame, a movable member carried by said frame and engaging said spool disc, a wire engaging guide mounted on said frame for movement relative thereto in response to a demand pull on said wire, and mechanical linkage interconnected between said wire guide and said movable member to amplify the force of a wire demand pull on said wire guide and transfer said force to said movable disc engaging member to start the disc turning in a direction to unwind wire from said spool.

5. A stand for feeding welding wire or the like from a supply spool as recited in claim 4 wherein said means journalling said spool core on said frame comprises a spindle insertable into said spool core, means mounting said spindle on said frame for movement between an operative positions wherein a spool on said spindle is held off the floor for rotation about the spindle axis and a loading position wherein said spindle is disposed to enter the core of a spool resting on the floor.

6. A stand for feeding welding wire or the like from a supply spool as recited in claim 5 including latch means carried by said frame and operable to lock said spindle in said operative position.

7. A stand for feeding welding wire or the like from a supply spool as recited in claim 5 wherein a plurality of caster wheels are mounted on said frame and disposed to support the frame for movement in all directions over the floor whereby said frame is readily bodily movable to facilitate insertion of said spindle into a spool core when said spindle is in said loading position without the necessity of maneuvering the spool and whereby said stand constitutes a dolly for a wire spool carried thereby when said spindle is in said operative position.

References Cited
UNITED STATES PATENTS

| | | | |
|---|---|---|---|
| 1,255,966 | 2/1918 | Whatley | 242—36 |
| 1,908,073 | 5/1933 | Spoor et al. | 242—129 |

LEONARD D. CHRISTIAN, *Primary Examiner.*